Middle of Phase 1 (full lines)
(End of Phase 1 shown in broken lines)

End of Phase 2.

End of Phase 3.
(Start)

INVENTOR
Robert H. Prew
BY Kenyon & Kenyon
ATTORNEYS

Patented Aug. 22, 1939

2,170,213

UNITED STATES PATENT OFFICE 2,170,213

INTERNAL COMBUSTION ENGINE

Robert H. Prew, Nashua, N. H.

Application November 7, 1936, Serial No. 109,619

18 Claims. (Cl. 123—43)

This invention relates to an internal combustion engine of novel design and operating upon a cycle which, by minor modifications within the engine, may be varied within wide limits.

One of the advantages of an engine constructed in accordance with this invention is the development of greatly increased horse-power at lower speeds, as compared with ordinary 2- or 4-cycle internal combustion engines now in common use. In consequence of the ability of an engine constructed according to this invention to develop increased horse-power at lower speeds, internal friction within the motor itself is greatly reduced leading to longer life of the motor itself and a higher thermal efficiency; and, in addition, because of the development of maximum power at relatively low speeds, engine vibration is lessened and, as a result, the parts and structures associated with the mechanism may have a longer life and be less subject to the dangers of crystallization.

Another advantage of an engine constructed according to this invention is the great reduction in the number and area of wearing surfaces, both as compared with a standard 2- or 4-cycle engine of equal weight, or as compared with such an engine of equal power. Not only are the number and area of wearing surfaces in an engine constructed according to this invention less than those of a standard 2- or 4-cycle engine of equal weight or of equal power, but the ability of an engine constructed according to this invention to equal the power developed by the common types of combustion engines at much lower engine speeds or to greatly exceed that power developed by the common types of combustion engines at equal engine speeds gives the added advantage of less wear on the moving parts required in this engine, resulting in greatly increased thermal efficiency.

A further advantage of an engine constructed according to this invention is that the power is applied tangentially to the circle of rotation, and along a relatively short arc thereof, with resulting elimination of the power loss inherent in a standard 2- or 4-cycle engine wherein the power is initially applied in a direction at right angles to the axis of the power shaft and must be translated into a tangential application by the use of a crank and connecting rod, thereby obtaining as rotative power only that component of the initial power thrust which is tangential to the circle of rotation of the crank and losing in friction on the shaft bearings that component of the thrust which is at right angles to the initial thrust.

A further advantage of an engine built according to this invention arises from its ability to develop a relatively large amount of power at slow speed, adapting it to use in automobiles without the use of a reduction gear, and to provide rapid acceleration due to the high frequency of impulses.

A further advantage of an engine constructed according to this invention is the light weight of such engine in relation to the horse-power produced, adapting it to airplane use because of the extremely high ratio of horse-power to engine weight.

A further advantage of this invention lies in the arrangement by which the suction feeding of the combustible mixture which is used in this invention as well as in the common engine, is here supplemented by the arrangement whereby the combustible mixture reaches the cylinders under the influence of centrifugal force whereby a supercharging effect is obtained without the use of supplementary apparatus and without sacrificing any part of the power developed by the engine to the driving of supercharging apparatus.

The combined influences of suction and supercharging will increase as the R. P. M. increases therefore supplying a greater supercharging effect at higher speeds when the motor is in need of it, or they may be reduced through any desired stages of infinite variation to a minimum of zero. This reduction can be accomplished by varying the percentage of air to gasoline vapor in the carbureter and by changing the length of cam surfaces 63 to allow valve 39 to close at any time between the beginning of the outward stroke of piston 57 and the end of the dwelling phase.

Such an arrangement is particularly valuable in overcoming the effect of frictional resistance of the combustible gases with the walls of the conduits through which they flow to the compression cylinder. The inertia of the gas molecules, during the period of dwell of the piston in the compression cylinder, permits centrifugal force to aid in the feed and to overcome the frictional resistance. In the engine here disclosed, the intake valve may remain open during two phases—that is to say, two-thirds—of the entire cycle, and thus there may be opportunity for centrifugal force to make its effect felt upon the incoming gases during a period twice as long as the length of the firing phase. In standard 2- or 4-cycle engines commonly known the period of intake can never be longer than the period of firing.

A further advantage of an engine constructed according to this invention adapting it more particularly to marine purposes, is the small and compact nature of the assembly, whereby the ratio of power to cubic capacity is very much larger than in standard 2- or 4-cycle internal engines heretofore used; and for marine purposes it is likewise an advantage of this engine that it is suited to operate at very low speeds without intermediate gear reduction.

A further advantage of an engine constructed in accordance with this invention lies in the adaptability thereof to an infinite number of changes of cycle, by a relatively simple change in mechanism, permitting an engine already built to be modified by comparatively small changes in its associated parts and structure adapting it for changes in cycle and accordingly in horsepower output. For example, the engine here shown by way of illustration comprises three pairs of cylinders, each pair connected to a single valve head, the three valve heads being positioned around the periphery of the rotating portion of the engine at equal intervals of 120°, and such engine is here shown arranged to produce a power impulse in each power cylinder in every 36° of rotation, making ten power impulses per revolution in each power cylinder; this arrangement is capable of infinite variations by changing the ratio of the gears which drive the box cams, and by suitable adjustment of the positions of the spark plugs and stop cams, to produce an engine wherein the power cylinder fires at any interval other than 36° which may be desired, with corresponding change in the cycle of operation and accordingly in the horse-power output of the engine. All of this may be accomplished with the number of cylinders and valve heads here shown. However, by increasing or decreasing the number of cylinders and valve heads, other variations in cycle may be introduced by the same means, thereby permitting an infinite variation in design adapting an engine built according to this invention to be designed within wide limits for any desired field of application, in much the same manner as an electric motor may be designed for wide variations in required speed or torque.

Referring to the specific disclosure here made—

There is here shown, solely by way of illustration, a variable cycle internal combustion engine built in accordance with this invention embodying three valve heads spaced at equal intervals of 120° about the periphery of the rotating member, and provided with box cams, stop cams and spark plugs suited to produce an explosion or power impulse in each of the power cylinders once in each 36° of rotation. Such form of the engine lends itself to convenient exposition, and has been selected for the purposes of this disclosure for that reason. It is believed, however, that the invention is not limited to an engine having the particular cycle here used by way of illustration, but extends to and embraces engines constructed as set forth in the subjoined claims and operating upon any cycle which is a variant of the cycle here shown, for the reason that in one of its aspects this invention comprises an engine of infinitely variable cycle, adapted to be produced according to any cycle best fitted to the work which the engine is intended to do.

While, in the engine here disclosed by way of illustration, the support for the valve heads (flywheel 18) rotates continuously with the driven shaft; the bed plate 10, ring 99 and stop cams 101, 102, etc., are stationary; and pistons 57, 59 and 85 rotate with the driven shaft but reciprocate relative thereto and to the valve heads, it is within the contemplation and purpose of this invention to provide an engine wherein these relationships are transposed in a manner which, in view of the disclosure here made, will be obvious to those skilled in the art, namely—

1. The pistons may rotate continuously with the driven shaft, the valve heads may rotate therewith but reciprocate relative thereto, and the bed plate, outer ring and stop cams may be stationary;

2. The valve heads may be secured to a stationary bed plate, the pistons may reciprocate relative thereto, and the outer ring and stop cams may rotate continuously with the driven shaft; or 3. The pistons may be secured to a stationary bed plate, the valve heads may reciprocate relative thereto, and the outer ring and stop cams may rotate continuously with the driven shaft.

Referring now to the annexed drawings—

Fig. 7 is a partial section along the plane 7, 7 of Fig. 2.

Fig. 8 is a section of the control mechanism 69 for transfer valve 41.

Fig. 9 is a section of the control mechanism 76 for inlet valve 39.

Fig. 10 is a diagrammatic representation illustrating the firing sequence in the engine here shown for purposes of illustration.

Figure 1:
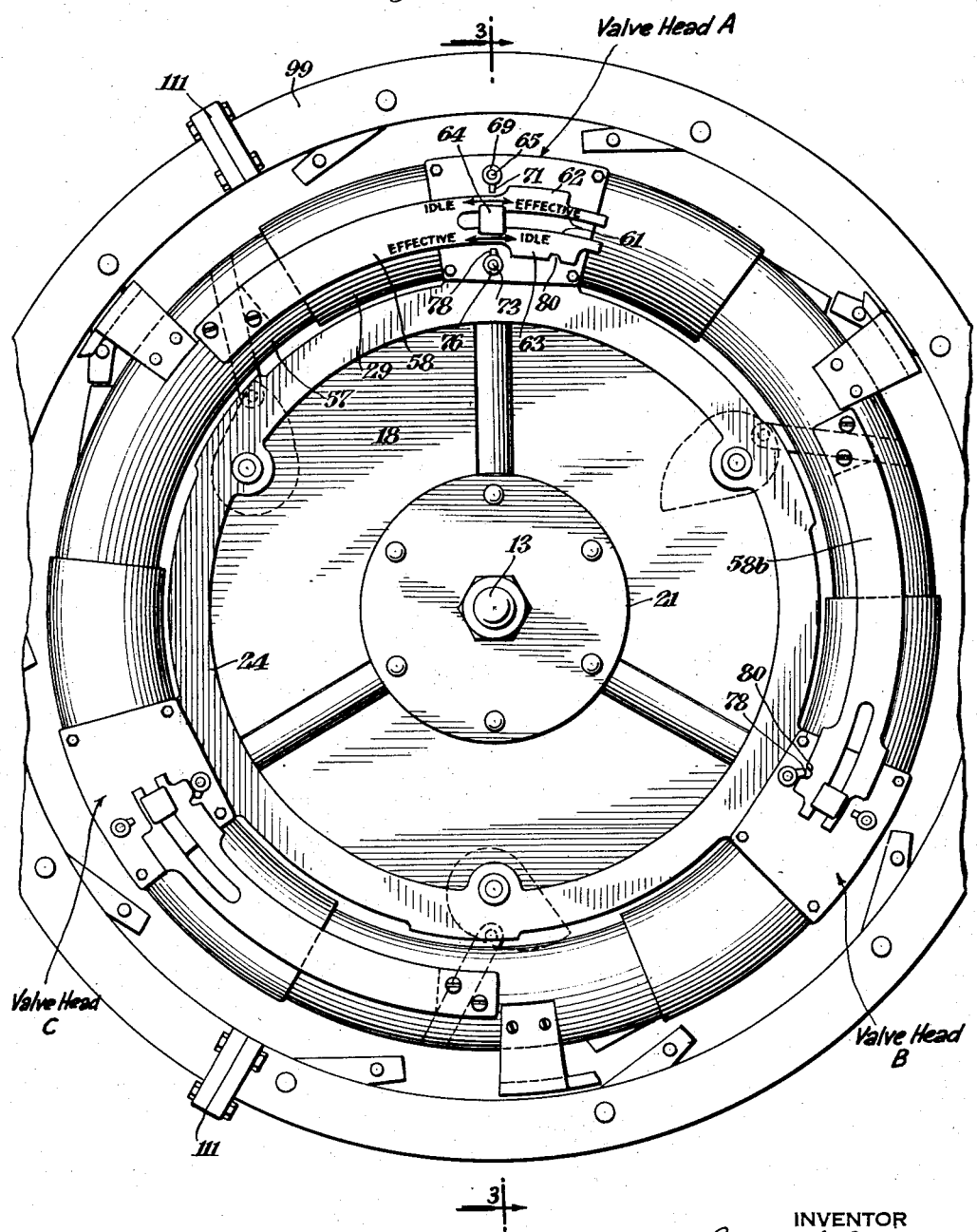
Fig. 1 is a vertical elevation of the front of the engine.

Referring to the drawings a supporting bed plate 10 of generally dished shape is secured to a fixed part (not shown) by any suitable bracket or other supporting means and serves as the main frame or support upon which the rotating parts and other parts of the engine are mounted. At its center bed plate 10 is provided with annular boss 11 fitted with a bearing 12. Within this bearing a stub shaft 13 is mounted for rotation. Said stub shaft is provided with shoulders 14 cooperating with the bearing, and is internally drilled at 15 for a portion of its length. A drilled cap 16 is threadedly secured to plate 10 and serves as the means whereby stub shaft 13 is secured within the bearing 12 against endwise displacement, in cooperation with the shoulders 14. In addition, the drilled opening within cap 16 is maintained in axial alignment with the drilled opening 15 in the stub shaft 13 and in substantially gas-tight relation therewith.

Upon that portion of stub shaft 13 which projects forwardly of the annular boss 11 are keyed, by the key 17, a flywheel 18 (hereinafter more fully described) having an upstanding annular intake chamber 36, and at the other end within a threaded opening in the upstanding annular flange 19 defining the gas chamber 20. Preferably each of these tubes 82, 82b and 82c is in radial alignment, respectively, with the corresponding opening 23 in stub shaft 13 (see Fig. 2). Accordingly the combustible mixture, which enters the engine through drilling 15 in the stub shaft 13 and passes thence through openings 23 to chamber 20, thereupon passes radially outwardly from the region of the center of flywheel 18 through centrifugal tubes 82, 82b and 82c to the inlet chambers 36 of the respective valve heads, positioned in the neighborhood of the periphery of the flywheel 18. Thus the combustible mixture is fed to the valve heads A, B and C from the center of the rotating flywheel 18 along the radius thereof toward the valve heads located at the periphery thereof, and the gases comprising such combustible mixture are therefore fed under the influence of centrifugal force, due to the rotating of the parts, producing a super-charging effect as explained below.

From what has been said it will now be apparent that, while each of the valve heads and its two associated cylinders are secured to the periphery of flywheel 18, and centrifugal feed tubes 82, 82b and 82c likewise rotate with flywheel 18, the three pistons 57, 59 and 85 are adapted to move along the arc of the circle having for its center the axial center of the flywheel 18, but only within limited arcs of rotation relative to the flywheel 18. For example, piston 57 at one end enters compression cylinder 29 and at its other end enters power cylinder 30c. Piston 57, when moving in either direction relative to the position of the cylinders, at one end approaches the "top" of its stroke in one of the cylinders, and at the same time its other end approaches the "bottom" of its stroke in the other cylinder. Upon reversal of movement, there is reversal of effect. Accordingly, piston 57, and likewise each of pistons 59 and 85, oscillates back and forth within a predetermined arc relative to the periphery of the flywheel 18, under the influence of mechanism hereinafter described. During such oscillation of the piston, however, the flywheel as a whole is rotating, and therefore the resultant motion of piston 57, relative to a stationary point is, during phase 1 in its trailing valve head, to move forwardly relative to the periphery of flywheel 18 and at a faster rate than the rate of travel of said periphery, thus in effect gaining on it, under the influence of mechanism hereinafter described; during phase 2, to remain at rest relative to the periphery of flywheel 18 and therefore to rotate at the same speed as said periphery; and during phase 3, to stop relative to a fixed point outside the rotating flywheel until the flywheel has moved through approximately 12° of rotation, thus in effect falling back to its original position relative to the flywheel.

The means by which these movements of the piston are brought about are as follows: mounted upon the rearward or under face of the flywheel 18 are three rotating box cams (see Figs. 2 and 3) positioned near the periphery of flywheel 18 and at equal distances of 120° apart. As these box cams are alike, differing only in the phases of their rotation at any given instant, it will be sufficient here to describe one of them, with its associated parts. A bar 86 (Fig. 3, bottom), secured to the piston in any suitable manner, projects inwardly thereof adjacent the underside of the rim 24 of the flywheel 18. Near the projecting end of this bar are secured two rollers 87 and 88, rotatably secured upon a suitable pin extending through bar 86. Roller 87 is adapted to engage between the two side walls 89 of an arcuate channel 90 formed along the periphery of flywheel 18. The length of channel 90 is such that roller 87 moves backward and forward within channel 90 which is long enough to accommodate the oscillations of the piston with reference to the periphery of the flywheel 18. Channel 90 thus serves as a guideway. Roller 88, projecting in the opposite direction from roller 87, is adapted to be acted upon by the rotating box cam now described.

Within an annular bearing 91 formed on the underside of flywheel 18 and near the periphery thereof, is rotatably secured a rotating box cam 92 provided with a pinion 93 adapted to engage an annular gear ring 94 secured upon the stationary bed plate 10 of the engine. The arrangement is such that as flywheel 18 revolves, box cam 92 mounted upon it revolves upon its own axis by reason of the engagement of its pinion 93 with the stationary gear ring 94. In the particular form of engine here described the ratio between the number of gear teeth on ring 94 and the number of gear teeth on pinion 93 is 10:1, and accordingly there are ten revolutions of pinion 93 for every revolution of flywheel 18. Such ratio is adapted to move each piston through its cycle of operations ten times in each revolution of the flywheel 18.

Figure 3:
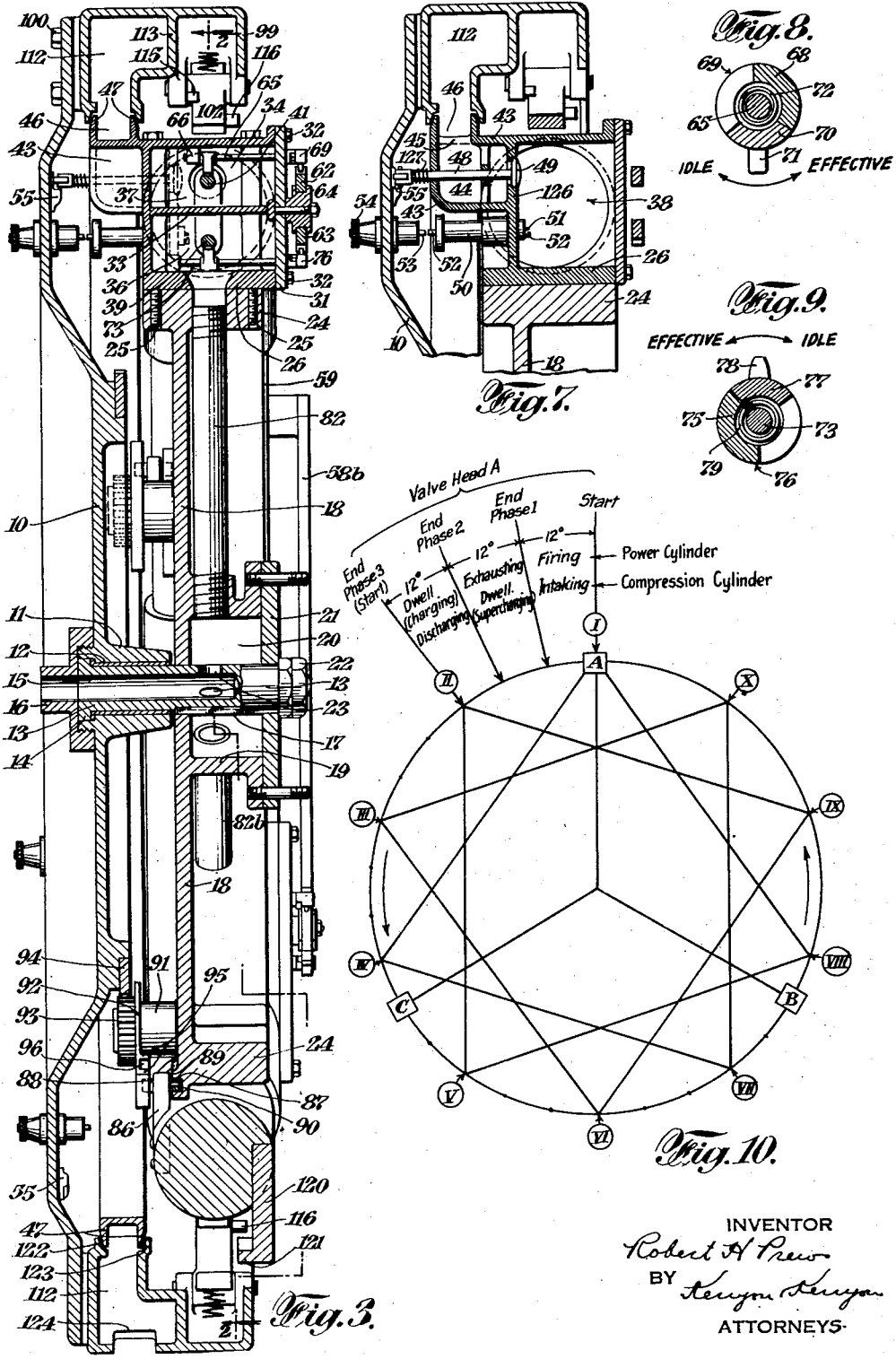
Fig. 3 is a vertical section on the plane 3, 3 of Fig. 2.
Figure 4:
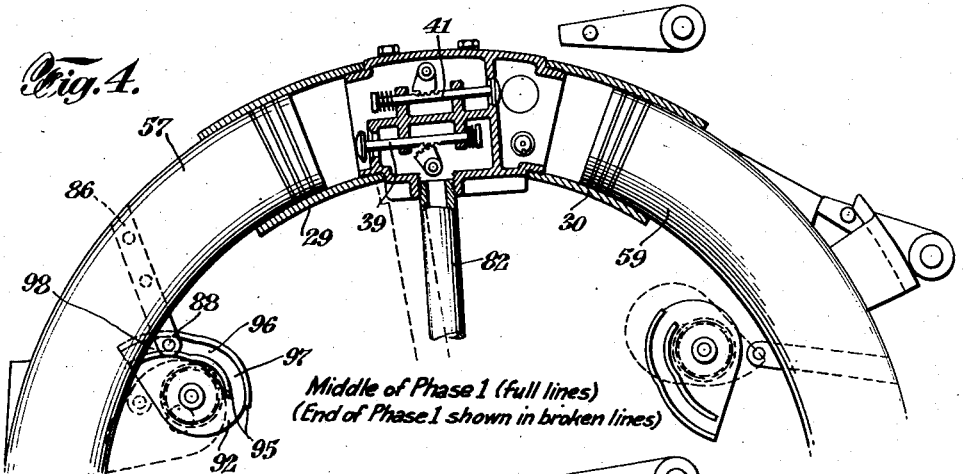
Fig. 4 is a fragmentary vertical section (on the same plane as that shown in Fig. 2) of valve head A at its position in the middle of its phase 1, with the position of certain parts at the end of phase 1 shown in dotted lines.

Box cam 92 is provided with walls 95 forming between them a channel 96 best seen in Fig. 4. The channel 96 is divided into two portions: a portion 97 occupying approximately 120° of the circumference of the box cam 92 and formed along the arc of a circle having its center at the axis of said box cam, and a second portion 98 immediately communicating with the first, occupying a somewhat shorter arc and formed along the arm of a flat spiral with respect to the axial center of said box cam. The arrangement is such (see Fig. 4) that as box cam 92 revolves in counterclockwise direction the portion 98 of channel 96 engages roller 88 and imparts a thrust thereto tending to move piston 57 in a counter-clockwise direction relative to the flywheel 18. By reason of the guiding of roller 87 (see Fig. 3, bottom) in channel 90, between the side walls 89 thereof, the effect is to move roller 87 forwardly within channel 90 through the required number of degrees along the periphery of flywheel 18, and sufficient to return that end of piston 57 which is within power cylinder 30c (associated with valve head C) to the "top" of its stroke, at the same time moving the opposite end thereof from its "top" to its "bottom" position within compression cylinder 29.

As box cam 92 continues its rotation roller 88 enters the circular portion 97 of the groove on the box cam. Because the radius of curvature of portion 97 of the groove on the box cam is less than the radius of curvature of slot 90 on flywheel 18, the effect is to secure piston 57 in fixed position relative to the periphery of flywheel 18 and to secure it there during all of the time that roller 88 is retained within the portion 97 of the channel on the box cam.

Figure 5:
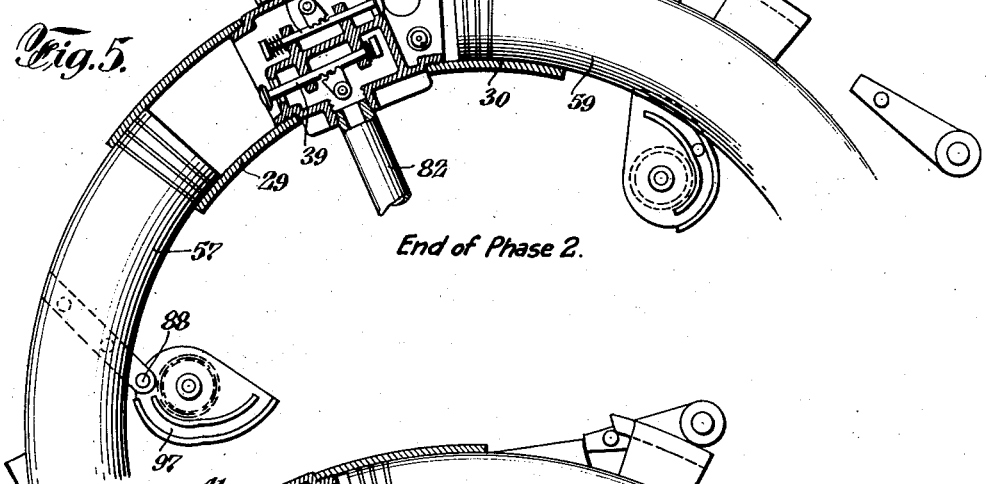
Fig. 5 shows the same parts as Fig. 4 at the end of phase 2.
Figure 6:
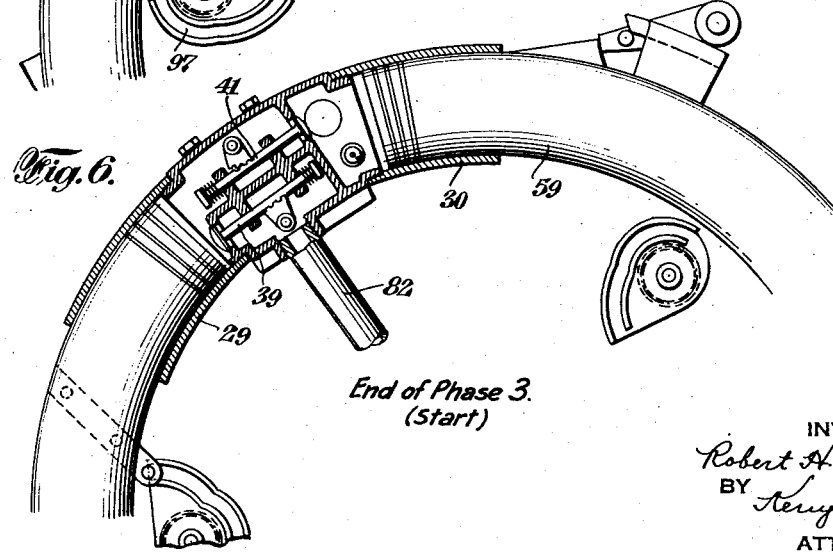
Fig. 6 shows the same parts as Fig. 4 at the end of phase 3, which is the same as the beginning of phase 1 (see valve head A in Fig. 2).

Further rotation of box cam 92 releases the engagement between groove 96 and roller 88 (see Fig. 5, left), and thereafter box cam 92 continues to revolve about its own axis until it has come around again to the point at which the outer spiral end once more engages roller 88 (Fig. 6, left). During the period of its dis-engagement, as hereafter set forth, the explosion of the combustible mixture in power cylinder 30c has returned piston 57 to its initial or starting position and has caused roller 87 to return to its initial or starting position in slot 90, and has returned roller 88 to a position where it is ready to be re-engaged by spiral portion 98 of box cam 92.

Thus box cam 92 comprises the mechanism by which piston 57 is advanced relative to the periphery of flywheel 18 and, after advance has been effected, is secured momentarily in its advanced position during the next phase as set forth below.

Figure 2:
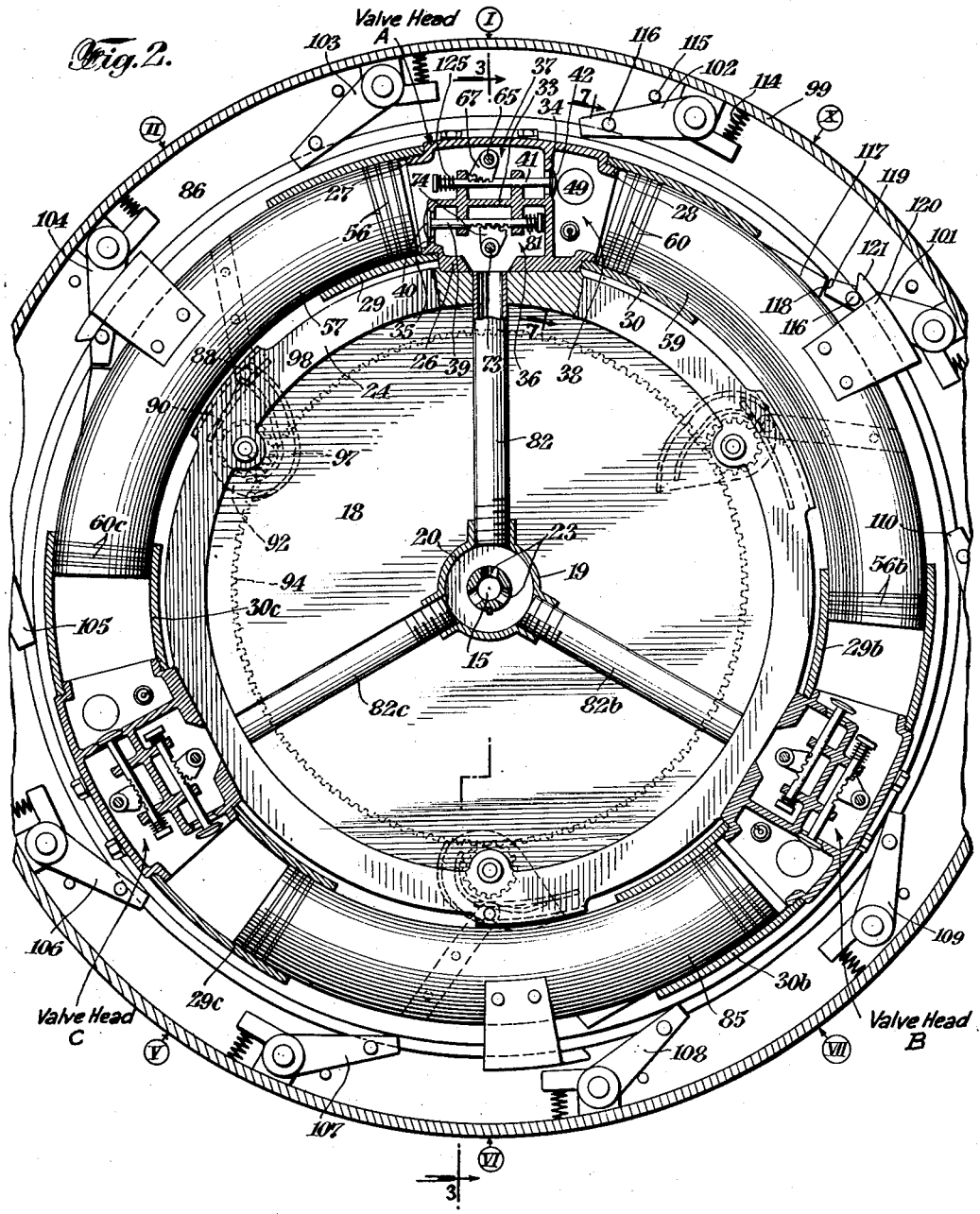
Fig. 2 is a vertical section on the plane 2, 2 of Fig. 3.

The power stroke will be described with reference to power cylinder 30 associated with valve head A. As seen at the top of Fig. 2 the piston 59 within this cylinder is at the "top" of its stroke relative to that cylinder and the cylinder has been charged with combustible gases. In order to permit the ensuing explosion within cylinder 30 to transmit its force in the direction of rotation of the flywheel 18, means are provided for momentarily securing piston 59 in fixed position. Said means comprise, in the engine here shown by way of illustration, a series of ten stop cams numbered from 101 to 110, inclusive. These stop cams are pivotally mounted upon an annular ring 99 secured to bed plate 10 by bolts 100. Ring 99, for convenience in assembly, may be cast in segments which may be bolted together as at 111. Ring 99 comprises a forward portion in which the stop cams are mounted, and a rearward portion forms an exhaust chamber 112 separated from the forward portion by wall 113.

Each of stop cams 101, 102, etc., is provided with a pivotal mounting within the ring 99, and is spring-held against a stop pin. Referring to stop cam 102 which appears near the top of Fig. 2 spring 114 is arranged to urge stop cam 102 in a clockwise direction against stop pin 115. The other stop cams are similarly arranged. Secured upon each of the stop cams is a protruding pin 116 by which the stop cam is actuated. The other stop cams have similarly arranged pins, all lying in the same arc about the center of flywheel 18.

Each of the pistons is provided with means cooperating with one or another of said stop cams to secure said piston momentarily in fixed position during the power stroke. Referring to piston 59—

Secured to piston 59 (see Fig. 2) is a shoulder 117 projecting outwardly from the exposed portion of the piston and having a curved trailing face 118 adapted to engage successively the curved outer end 119 of each of the stop cams 101, 102, etc. when the latter has been depressed behind said trailing face 118. When that engagement has been effected, the arrangement is such that the arcs of curvature of face 118 and of the end face 119 of the stop cam have their centers in common upon the pivotal center of the stop cam.

Secured to the piston adjacent shoulder 117 is actuating cam 120 having a bent-over portion 121 adapted to engage successively the pins 116 of each of the ten stop cams as the flywheel 18 revolves, and upon such engagement to depress such pin and stop cam from the normal position of the stop cam (e. g., stop cam 102 in Fig. 2) to depressed position (e. g., stop cam 101 in Fig. 2) wherein face 119 of the stop cam is in alignment with and as nearly as possible in contact with trailing face 118 of the piston shoulder. It is intended that trailing face 118 shall be in contact with face 119 of a stop cam during the power stroke in a power cylinder, that is, during the power stroke which is next to ensue in cylinder 30 as it appears in the position shown in Fig. 2. In this way piston 59 is supported upon stop cam 101 during the explosion within cylinder 30 and the force of that explosion is, by reaction, transmitted in a direction tending to make flywheel 18 rotate in a counter-clockwise direction as seen in Fig. 2. During the next succeeding phase, when piston 59 is moved forwardly under the influence of its associated box cam to its initial position with respect to power cylinder 30, actuating cam 120 moves forwardly and disengages pin 116 thereby permitting stop cam 101 to return under the influence of its spring to its normal position of rest against its stop pin.

In the particular form of engine here described there are ten positions or firing points about the periphery of ring 99 at which ignition takes place in any of the cylinders, as appears in more detail below. Accordingly ten stop cams are provided, at equal intervals of 36° apart, each serving all the pistons.

Exhaust gases, passing outwardly from explosion chamber 38 (see Fig. 7) through exhaust valve 49 and into exhaust chamber 44 are released into annular exhaust channel 46 which is continuous around the periphery of the flywheel 18. The walls 47 of this channel (see Fig. 3, bottom) are slightly tapered on their outer surface and enter within recesses of the stationary flanges 122, 123 forming a part of the retaining walls of the annular exhaust chamber 112. Walls 47, 47 do not make contact with walls 122, 123, but project within the latter to some extent in order that the discharged exhaust gases may be guided into the exhaust chamber 112, but a slight space is left between walls 47, 47 and walls 122, 123 to avoid any frictional resistance between them.

The exhaust gases within exhaust chamber 112 are drawn out through opening 124 and, preferably, are discharged into a zone of reduced pressure to facilitate removal of these gases, to improve the thermal efficiency of the engine and to minimize leakage between the walls 47, 47 and 122, 123. Such reduced pressure may be provided by any suitable means (not shown).

The operation of the foregoing engine is as follows:

A combustible mixture is introduced through the hollow shaft 15 (see Fig. 3) and passes radially outward to the valve heads through the centrifugal feed tubes 82, 82b and 82c where it enters intake chamber 36 and remains under control of inlet valve 39. Referring to the cylinders associated with valve head A (see Fig. 2) it will be assumed that a combustible mixture under high pressure is in contact with the head of the piston in cylinder 30 and the valves associated with that cylinder are closed. At this moment a spark occurs between the sparking points 51, 52 in said cylinder and expansive force is developed within said cylinder. Because of the engagement of trailing face 118 of shoulder 117 with stop cam 101, piston 59 cannot move in a clockwise direction. Accordingly, as piston 59 is secured against clockwise movement, the expansive force of the burning gases in cylinder 30 causes valve head A, and with it flywheel 18, to move in a counter-clockwise direction.

Such motion of flywheel 18 causes box cam 92 to rotate (also in a counter-clockwise direction) because of the engagement of its gear wheel 93 with the fixed gear ring 94 secured to the bed plate 10. Rotation of box cam 92 causes portion 96 of trough 96 of said box cam to engage roller 88 and move it, and piston 57 to which it is secured, forwardly relative to the periphery of flywheel 18 and at a greater speed than said flywheel. Thus piston 57 moves outwardly with respect to combustion cylinder 29 during this phase of the cycle. The arrangement of the intake valve cams upon bar 63, and the associated mechanism already described, is such that during the time piston 57 is moving outwardly with respect to cylinder 29, inlet valve 39 is open permitting combustible gases to be drawn from inlet chamber 36 into compression cylinder 29. Inlet valve 39 in the form of engine here disclosed, remains open during all the time that piston 57 is moving outwardly. Accordingly a fresh charge of combustible gases is drawn into the compression cylinder 29 during this phase of the cycle. The movement of gases during this phase of the cycle is aided by centrifugal forces acting upon the gas molecules tending to move the gas outwardly through centrifugal feed tube 82. It is to be understood that, by suitable modification of the length of cam surface 63, inlet valve 39 may be closed at any time from the start of the outward movement of piston 57 to the start of the inward movement after its dwelling phase. The length of time this valve remains open preferably is made to depend upon the degree of supercharging desirable at any given mixture of the combustible fuel.

What has been described above will be referred to here as "phase 1" of the complete cycle which consists of three phases. Fig. 4 shows the position of the respective parts associated with valve head A at about the middle of phase 1, and shows the position of some of these parts at the end of phase 1 in dotted lines. The position of the parts at the end of phase 1 may be seen in full lines in respect of valve head C shown in Fig. 2 which, at the position of the apparatus shown in that figure, has reached the end of phase 1 of the cycle. In the form of engine here described, valve head A passes through "phase 1" of its cycle during 12° of rotation of the flywheel 18. At the end of phase 1 each of the pistons associated with valve head A is at the "bottom" of its stroke, the inlet valve 39 is open, the transfer valve 41 is closed and the exhaust valve 48 is closed.

During the second phase of the cycle the circular portion 97 of box cam 92 is in engagement with roller 88, and accordingly piston 57 remains secured in its "bottom" position with respect to cylinder 29 and dwells in this position during all of the second phase of the cycle. During this phase inlet valve 39 remains open, as already explained, and centrifugal forces act upon the combustible gases in pipe 82 to elevate somewhat the pressure of the combustible gases within cylinder 29. This dwell, with the inlet valve open, produces a supercharging effect and improves the efficiency of the engine.

During the second phase the box cam associated with piston 59 engages the roller secured to said piston and moves said piston forwardly, in effect overtaking the moving periphery of flywheel 18 and raising piston 59 to the "top" of its stroke within cylinder 30. During this phase of the cycle exhaust valve 48 is opened by engagement of the end thereof with one of cams 55 suitably located to be effective during this phase of the operation. Accordingly burned gases within power cylinder 30 and explosion chamber 38 are expelled during "phase 2" through exhaust chamber 43 into exhaust chamber 112. The arrangement of cam 55 is such that exhaust valve 48 has closed at the end of "phase 2".

The position of the parts associated with valve head A at the end of "phase 2" are shown in Fig. 5. At this time piston 59 is at the "top" of its stroke in cylinder 30. Exhaust gases have been expelled therefrom and the exhaust valve has just closed. Piston 57 in compression cylinder 29 however, is at this stage dwelling at the "bottom" of its stroke and inlet valve 39 remains open. These parts have remained stationary during all of "phase 2" because of the engagement of roller 88 with the arcuate portion 97 of the slot in the box cam. At the end of phase 2 the power cylinder 30 has been cleared of burned gases, and the compression cylinder 29 has been filled and supercharged with fresh combustible mixture.

During "phase 3" the combustible mixture in compression cylinder 29 is compressed and transferred into power cylinder 30, and during that time piston 59 dwells at the "top" of its stroke within cylinder 30. Piston 57 is moved from its "bottom" position to its "top" position within cylinder 29 during "phase 3" by reason of the power impulse derived from an explosion within the power cylinder associated with valve head C. While valve head A is passing through its "phase 3", valve head C is passing through its "phase 1" which includes an explosion within its power cylinder resulting in advance of flywheel 18 relative to piston 57 which is momentarily secured in stationary position by reason of the engagement of its shoulder 117 with an appropriately positioned stop cam (in this instance stop cam 105). As piston 57 commences to move "upwardly" within cylinder 29, notch 80 of valve rod 63, as above set forth, closes inlet valve 39 and at the same time the cam surface associated with valve rod 62 opens transfer valve 41. During "phase 3" in valve head A, therefore, inlet valve 39 is closed and transfer valve 41 is open, thus permitting the combustible gases within cylinder 29 to be compressed and transferred into the head of cylinder 30. During "phase 3" piston 59 dwells at the "top" of its stroke within cylinder 30, by reason of the engagement of its roller 88 with the arcuate portion of the box cam associated therewith.

At the completion of "phase 3" (see Fig. 6) the cam surfaces upon bar 62 disengage the actuating means for transfer valve 41 and the same closes under the influence of its spring 127. Accordingly, at the end of "phase 3" both pistons are at the "top" of their respective strokes in cylinders 29 and 30, and a charge of combustible gases has been compressed within cylinder 29 and tranferred into the head of cylinder 30 and the transfer valve 41 has been closed. The mechanism is now ready for the next explosion and has completed one full cycle of operation, consisting of three distinct phases, which have been accomplished during the time that the flywheel 18 has rotated through an arc of 36°. Each of the three phases occupies approximately 12° of this rotation.

In more condensed form the cycle just described is shown diagrammatically in Fig. 10. Referring to these drawings it will be observed that during the first phase (12°) the power cylinder 30 is firing and the compression cylinder 29 is intaking. During the second phase (12°) the power cylinder 30 is exhausting its burned gases, and the piston within compression cylinder 29 is dwelling in its "bottom" position in order that the effect of centrifugal force within pipe 82 may produce a supercharging effect. During the third phase (12°) the piston within power cylinder 30 is dwelling at the "top" of its stroke, while a charge of combustible gases is being transferred into the space above this piston, and the piston within the compression cylinder 29 is moving toward the "top" of its stroke and is thereby compressing the combustible mixture within cylinder 29 and transferring it to cylinder 30. In the particular form of engine here described valve heads A, B and C are positioned at equal distances of 120° apart around the periphery of flywheel 18. Each valve head, with its associated cylinders, goes through the same cycle of operation as described above in connection with valve head A. The phases are not synchronous, however, but are in rotation. Thus, as valve head A passes through "phase 1" of its cycle, valve head B passes through phase 3 and valve head C passes through phase 2. Accordingly, the cycles of operation in the valve heads bear a phase relation of 120° to each other. Since there is a power impulse in "phase 1" of the cycle of each valve head group, there is accordingly a power impulse imparted to the flywheel 18 from one or another of the power cylinders during each phase of the cycle in valve head A, or every 12° of rotation of flywheel 18.

In the particular form of engine here shown, in which there are three valve head groups and each completes its cycle in 36° of rotation, there are ten fixed points about the periphery of the flywheel 18 at which a power impulse is produced. These may be referred to as "firing points". In Fig. 10 these firing points are designated by "I", "II", "III", "IV", etc., separated from each other by 36° of arc. In Fig. 10 it will be seen that valve head A, taken at its starting position, is at firing point I. At this instant valve head C is 12° beyond firing point IV and valve head B is 24° beyond firing point VII and is 12° short of firing point VIII. As valve head A reaches the end of its phase 1, having moved through 12°, valve head B completes its own "phase 3" and reaches firing point VIII. At the same time valve head C moves forwardly 12° and passes through phase 2 of its cycle. As valve head A moves forwardly to the end of phase 2 of its cycle, through a second arc of 12°, valve head C passes through its "phase 3" and reaches firing point V.

Accordingly, as the cycle is repeated in each of the several valve head groups, each of the valve heads will be served by the same ten firing points, and the order of firing may be ascertained from the diagram Fig. 10 by following the line which leads from firing point I to VIII, VIII to V, V to II, etc. As the sequence is followed through it will be noted that after the completion of the ninth fire the next firing line returns to the position initially occupied by A. After the tenth explosion the motor will have completed ⅓ of a revolution or 120°, accordingly, at this stage A will occupy C's position, C will occupy B's position, and B will occupy A's position. The firing sequence continues of course without interruption along the lines in the diagram. After the next 9 fires, the firing line again returns to position shown as being initially occupied by A. This time, however, the motor has completed ⅔ of a revolution and A now occupies B's position, B occupies C's position, and C occupies A's position. After the next 9 fires the valve heads have returned to their original positions, the motor having made one complete revolution, each combustion cylinder having fired 10 times and the motor as a whole having fired 30 times.

In this way an extremely balanced order of firing is attained, so that the distribution of power impulses about the periphery of the engine is kept in relative balance and undue vibration is avoided.

Any suitable mechanism may be employed for producing a spark impulse in the spark plug at the appropriate "firing point".

The form of engine here disclosed is intended primarily for aviation use and is intended to have its cylinders cooled by air. Suitable fins (not shown) may be provided upon the power cylinders and elsewhere as needed in order to dissipate the heat of combustion. This or other forms of the engine may be provided with water cooling systems, if desired.

An engine built according to this invention has a greatly increased horse-power over standard 2- or 4-cycle engines built on known principles because of the larger number of power impulses per cylinder per revolution. In the engine above described there are thirty power impulses per revolution, each power cylinder furnishing ten power impulses. The indicated horse-power per cylinder of an internal combustion engine is shown by the formula:

$$\text{I. H. P. per cyl.} = \frac{\text{ft. lbs. per cyl.}}{33,000} \times \frac{\text{R. P. M.}}{\text{cycle}}$$

Assuming that each of the three power cylinders in the engine here disclosed is so shaped, has such a bore and stroke, and uses such fuel, as to produce 3300 ft. lbs. of energy in each explosion, and that "cycle" means the number of half-revolutions which the engine makes for each power stroke in a cylinder (the standard 4-cycle engine is so called because it rotates through four half-revolutions for each power stroke in a cylinder) then a standard 4-cycle engine, having such a cylinder, at 1000 R. P. M. would produce 25 indicated horse power per cylinder according to the above formula as follows:

$$\frac{3300}{33000} \times \frac{1000}{4} = 25 \text{ i. h. p. per cyl.}$$

An engine constructed as disclosed herein rotates $\frac{1}{10}$ of a revolution, or ⅕ of a half-revolution, for each power stroke in a power cylinder. The engine here shown is, accordingly, a ⅕ cycle engine, and assuming the same ft.-lb. energy output per power cylinder and the same R. P. M. as the 4-cycle engine shown above, the indicated horse-power output per cylinder of an engine constructed in accordance with this invention would be $$\frac{3300}{33000} \times \frac{1000}{1/5} = 500 \text{ i. h. p. per cyl.}$$

It follows that an engine built according to this invention, when adjusted to operate at a ⅕ cycle, will produce 20 times the indicated horse-power per cylinder, at the same speed and assuming identical cylinder and fuel conditions, of a standard 4-cycle engine of known type. This gain is attributable to the increased number of explosions in each cylinder during a half-revolution, or, in other words, a decreased cycle. Thus there is greater utilization of each cylinder, and in consequence the total number of cylinders (also moving parts and frictional resistance) may be reduced for the same or a larger horse power output. At the same time, the power is produced at much lower speed, resulting in less vibration and greater thermal efficiency—i. e., greater utilization of the energy present in the fuel.

When it is desired to vary the cycle of the engine, retaining the three equally-spaced valve head groups, this can be done by changing the ratio between gears 93 associated with the rotating box cams 92, and the fixed gear ring 94. In the engine disclosed herein this ratio is 10:1, resulting in a spacing of the firing points for a given valve head 36° apart. By increasing or decreasing the ratio of these gears, the firing points may be moved closer together, or farther apart. In this event suitable adjustment is made of the positions of the stop cams 101, 102, etc., the sparking points 53 and the exhaust cams 55. Within the scope of this invention there may be a plurality of series of stop cams 101, 102, etc., one series thereof cooperating only with a single piston, or group of pistons, and other series laterally displaced from the first series and from each other cooperating with other pistons or groups thereof. If necessary, the sparking points 53 may be arranged in a plurality of series, each series being laterally displaced from the other series, each series serving a single valve head or group of valve heads.

Accordingly, as a part of this invention, the cycle of the engine is susceptible of substantially infinite variations, retaining the three valve heads shown. If desired, the number of valve heads may be increased and in that way other series of variations may be introduced within the spirit and intent of this invention.

By thus providing an engine susceptible of changes in its cycle, this invention comprehends in one of its aspects the provision of a variable-cycle engine which may be adapted within wide limits of variations suiting it for particular kinds or types of power application. As indicated by the formula above given, the lower the value of the cycle, the higher the indicated horse-power of the engine; and conversely, the higher the value of the cycle, the lower will be the indicated horse-power of the engine. Standard engines as heretofore known necessarily operate either at 2- or 4-cycles. With the engine which forms the subject of this invention it is possible not only to attain a value for the cycle substantially less than two, and as low as one-fifth, but it is also possible by relatively minor change in the associated parts of the engine to attain at will substantially any cycle which may be desired within wide limits and, theoretically at least, within infinite limits. In this way it becomes feasible, according to this invention, to build an internal combustion engine capable of adjustment to any desired cycle. In consequence, engines made according to this invention may be designed within wide limits to the demands and requirements of particular situations, in somewhat the same manner as electric motors are designed to meet particular requirements of starting torque, sustained power, speeds at which maximum power is developed, and the like. The latter advantages, in some measure at least, are believed to inhere in the internal combustion engine here disclosed.

I claim:

1. An internal combustion engine having a pair of interconnecting power and compression cylinders each provided with a piston, comprising in combination, means to produce an explosion in the power cylinder while the piston in the compression cylinder is intaking, means to exhaust burned gases from the power cylinder while the piston within the compression cylinder is dwelling, and means to move the piston within the compression cylinder to transfer combustible gases from the compression cylinder to the power cylinder while the piston within the power cylinder is dwelling.

2. In an internal combustion engine having a compression cylinder and a piston therein, means to cause the piston within said compression cylinder to move to draw a charge of combustible gases into said cylinder, means to cause said piston to dwell in the position to which it has moved during a period in which said charge is compressed under the influence of centrifugal force, and means to cause said piston to return to its original position thereby further compressing said charge of gas and discharging it from said cylinder.

3. In an internal combustion engine, a combustion cylinder and a piston therein, means to cause said piston to dwell during that phase of its cycle which immediately succeeds its exhaust phase, and means to transfer a charge of combustible gas to said cylinder during said dwelling phase.

4. In an internal combustion engine, a compression cylinder and a piston therein, means to cause said piston to dwell during that phase of its cycle which immediately succeeds its intaking phase, and means to permit combustible gases to flow to said cylinder under the influence of centrifugal force during said dwelling phase.

5. In an internal combustion engine, a compression cylinder and a piston therein, means to cause said piston to dwell during that phase of its cycle which immediately succeeds its intaking phase, and means operative during said dwell interconnecting said cylinder with a source of combustible mixture.

6. In an internal combustion engine, a compression cylinder and a piston therein, means to cause said piston to dwell during that phase of its cycle which immediately succeeds its intaking phase, and means operative during said dwell interconnecting said cylinder with a source of combustible mixture under elevated pressure whereby the pressure within said cylinder may be increased during said dwell.

7. An internal combustion engine comprising, in combination, a power cylinder and a piston therein, and movable relative thereto, means to produce an explosion within said cylinder and to convert the expansive force of the burning gases therein into rotating power, said piston moving relative to said cylinder according to a cycle of operation consisting of three phases of equal length, namely, a combustion phase, an exhaust phase, and a dwelling phase during which a fresh charge of combustible gas is transferred into said cylinder.

8. An internal combustion engine having a pair of interconnecting power and compression cylinders each provided with a piston, comprising in combination, an intake valve controlling the flow of combustible mixture to said compression cylinder, a transfer valve controlling the flow of combustible mixture from said compression cylinder to said power cylinder, an exhaust valve controlling the flow of burned gases from said power cylinder, and means to operate said valves according to a cycle of operation consisting of three phases of equal length, namely, a phase during which said intake valve is open and said transfer and exhaust valves are closed, a phase during which said intake and exhaust valves are open and said transfer valve is closed, and a phase during which said transfer valve is open and said intake and exhaust valves are closed.

9. In an internal combustion engine having a pair of power and compression cylinders with interconnected piston heads which enter said cylinders respectively, in combination, means to produce an explosion in the power cylinder moving said piston heads in a direction to expel combustible mixture from the compression cylinder, means effective upon the completion of said motion to return said piston heads to their initial position thereby expelling burned gases from the power cylinder and intaking fresh combustible mixture into the compression cylinder, and means to secure said piston heads in said initial position during a succeeding phase of dwell during which the power cylinder is charged with fresh combustible mixture.

10. In an internal combustion engine having a pair of power and compression cylinders with interconnected piston heads which enter said cylinders respectively, in combination, means to produce an explosion in the power cylinder moving said piston heads in a direction to expel combustible mixture from the compression cylinder, means effective upon the completion of said motion to return said piston heads to their initial position thereby expelling burned gases from the power cylinder and intaking fresh combustible mixture into the compression cylinder, and means to secure said piston heads in said initial position during a succeeding phase of dwell during which the power cylinder is charged with fresh combustible mixture and the combustible mixture in the compression cylinder is placed under increased pressure.

11. In an internal combustion engine having a pair of power and compression cylinders with interconnected piston heads which enter said cylinders respectively, in combination, means to produce an explosion in the power cylinder moving said piston heads in a direction to expel combustible mixture from the compression cylinder, rotating means engageable with means operatively secured to said piston heads for returning said piston heads to initial position, and means to secure said piston heads in said initial position during a succeeding phase of dwell during which a fresh charge of combustible mixture is transferred into said power cylinder.

12. In an internal combustion engine having a pair of power and compression cylinders with interconnected piston heads which enter said cylinders respectively, in combination, means to produce an explosion in the power cylinder moving said piston heads in a direction to expel combustible mixture from the compression cylinder, rotating means engageable with means operatively secured to said piston heads for returning said piston heads to initial position, and means associated with said rotating means to secure said piston heads in said initial position during a succeeding phase of dwell during which a fresh charge of combustible mixture is transferred into said power cylinder.

13. In an internal combustion engine having a pair of power and compression cylinders, a piston head within each of said cylinders, means interconnecting the heads of said pistons so that they move together and providing a cam enaging surface, a rotating cam member, said member having a cam surface adapted to engage said cam engaging surface and, upon the completion of combustion in the power cylinder, to move said piston.

14. In an internal combustion engine having opposed power and compression cylinders, a piston head within each of said cylinders, means interconnecting the heads of said pistons so that they move together and providing a cam engaging surface, a rotating cam member, said member having a cam surface adapted to engage said cam engaging surface and adapted, upon partial rotation of said cam member, to move said pistons to initial position and upon further rotation thereof to secure said pistons during a dwelling phase.

15. In an engine of the class described, a rotating cam adapted during a part of its arc of rotation to move one element of a relatively movable pair consisting of a piston and a cylinder relative to the other, and upon further rotation thereof to secure said elements in a position of dwell relative to each other.

16. An internal combustion engine comprising, in combination, a rotatable wheel, a compression cylinder supported near the periphery of said wheel, a piston therein, an intake manifold for combustible mixture spaced inwardly from the periphery of said wheel, a conduit disposed upon said wheel and interconnecting said manifold and said cylinder, a valve controlling the movement of combustible mixture in said conduit, and means actuated during outward movement of said piston in the cylinder for opening said valve and for maintaining said valve open after the piston has reached its outward position whereby a charge of combustible mixture drawn into said cylinder is raised to superatmospheric pressure under the influence of centrifugal force as said wheel rotates.

17. In an internal combustion engine, a combustion cylinder and a compression cylinder, a piston movable within each of said cylinders, means adapting the piston in the combustion cylinder to move according to a cycle consisting of three phases, namely, a combustion phase, an exhaust phase, and a dwelling phase in which the piston remains near the top of its stroke in the cylinder, and means adapting the piston in the compression cylinder to move to transfer a charge of combustible gas from said compression cylinder to said combustion cylinder during the dwelling phase of the piston in the latter cylinder.

18. In an internal combustion engine, a combustion cylinder, a piston movable within said cylinder, means adapting the said piston to move according to a cycle consisting of three phases, namely, a combustion phase in which the piston moves toward the bottom of its stroke within the cylinder, an exhaust phase in which the piston moves toward the top of its stroke within the cylinder, and a dwelling phase in which the piston remains near the top of its stroke in the cylinder, and means to transfer a charge of combustible gas to said combustion cylinder during the dwelling phase of the piston therein.

ROBERT H. PREW.